US008849570B2

(12) United States Patent
Russ et al.

(10) Patent No.: US 8,849,570 B2
(45) Date of Patent: Sep. 30, 2014

(54) PROJECTED WAY-FINDING

(75) Inventors: V. Kevin Russ, Bellevue, WA (US);
John A. Snavely, Seattle, WA (US);
Edwin R. Burtner, Everett, WA (US);
Ian M. Sands, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 12/407,058

(22) Filed: Mar. 19, 2009

(65) Prior Publication Data
US 2010/0241348 A1    Sep. 23, 2010

(51) Int. Cl.
*G01C 21/20*    (2006.01)
*G06K 9/00*    (2006.01)

(52) U.S. Cl.
CPC ...................................... *G01C 21/20* (2013.01)
USPC .......................................... 701/523; 382/106

(58) Field of Classification Search
CPC ............... G01C 21/3647; G01C 15/00; G01C 21/3635; G01S 19/13; G01S 19/41; G01S 19/43; G01S 19/44; G09G 2340/0492; G09G 3/001
See application file for complete search history.

(56) References Cited

U.S. PATENT DOCUMENTS

| | | | |
|---|---|---|---|
| 4,495,568 A | | 1/1985 | Gilbert et al. |
| 5,115,398 A | * | 5/1992 | De Jong ........................ 701/523 |
| 5,602,564 A | | 2/1997 | Iwamura et al. |
| 5,790,769 A | | 8/1998 | Buxton et al. |
| 5,929,844 A | | 7/1999 | Barnes |
| 6,002,808 A | | 12/1999 | Freeman |
| 6,014,142 A | * | 1/2000 | LaHood ........................ 715/848 |
| 6,128,003 A | | 10/2000 | Smith et al. |
| 6,184,847 B1 | | 2/2001 | Fateh et al. |
| 6,201,554 B1 | | 3/2001 | Lands |
| 6,211,884 B1 | | 4/2001 | Knittel et al. |
| 6,285,317 B1 | * | 9/2001 | Ong ........................ 342/357.57 |
| 6,292,137 B1 | * | 9/2001 | Agnew et al. ................. 342/443 |
| 6,340,957 B1 | | 1/2002 | Adler et al. |

(Continued)

FOREIGN PATENT DOCUMENTS

CN        1438802 A        8/2003
JP        11-134087        5/1999

(Continued)

OTHER PUBLICATIONS

Thomas H. Kolbe, Bonn, "Augmented Videos and Panoramas for Pedestrian Navigation," Proceedings of the $2^{nd}$ Symposium on Location Based Services & TeleCartography, Jan. 28-29, 2004, pp. 1-10, http://www.ikg.uni-bonn.de/uploads/tx_ikgpublication/TeleCartography2004_Kolbe.pdf.

(Continued)

*Primary Examiner* — F. Zeender
*Assistant Examiner* — Dana Amsdell
(74) *Attorney, Agent, or Firm* — Rachael Vaughn; Jim Ross; Micky Minhas (57) ABSTRACT

Navigation information may be provided. First, a destination location may be received at a portable device. Next, a current location of the portable device maybe detected. Then, at least one way-point may be calculated based on the current location and the destination location. An orientation and a level of the portable device may be determined and the at least one way-point may then be projected from the portable device.

20 Claims, 3 Drawing Sheets

(56) References Cited

U.S. PATENT DOCUMENTS

| | | |
|---|---|---|
| 6,392,661 B1 | 5/2002 | Tankersley |
| 6,393,360 B1 | 5/2002 | Ma ................................ 701/208 |
| 6,417,866 B1 | 7/2002 | Man et al. |
| 6,480,148 B1* | 11/2002 | Wilson et al. ............ 342/357.32 |
| 6,594,564 B1 | 7/2003 | Vahle et al. ...................... 701/35 |
| 6,823,259 B2 | 11/2004 | Miyazawa ..................... 701/209 |
| 7,231,297 B2 | 6/2007 | Sumizawa et al. ............ 701/211 |
| 7,280,097 B2 | 10/2007 | Chen et al. |
| 7,349,799 B2 | 3/2008 | Joe et al. ....................... 701/117 |
| 7,383,123 B2 | 6/2008 | Park .............................. 701/200 |
| 7,461,345 B2 | 12/2008 | Lettau |
| 7,539,513 B2* | 5/2009 | Cathey et al. ............... 455/556.1 |
| 7,978,176 B2 | 7/2011 | Forstall et al. |
| 8,121,640 B2 | 2/2012 | Russ et al. |
| 8,219,028 B1 | 7/2012 | Flamholz |
| 8,542,186 B2 | 9/2013 | Alameh et al. |
| 8,798,669 B2 | 8/2014 | Russ et al. |
| 2003/0156124 A1 | 8/2003 | Good et al. |
| 2003/0184575 A1* | 10/2003 | Reho et al. .................... 345/714 |
| 2004/0056907 A1 | 3/2004 | Sharma et al. |
| 2004/0122591 A1* | 6/2004 | MacPhail ...................... 701/209 |
| 2004/0252120 A1 | 12/2004 | Hunleth et al. |
| 2005/0030255 A1 | 2/2005 | Chiu et al. |
| 2005/0093868 A1 | 5/2005 | Hinckley |
| 2005/0192044 A1 | 9/2005 | Travis |
| 2005/0256781 A1 | 11/2005 | Sands et al. ...................... 705/26 |
| 2005/0257174 A1 | 11/2005 | Wilson |
| 2006/0019714 A1 | 1/2006 | Lee et al. |
| 2006/0164412 A1* | 7/2006 | Dupont et al. ................. 345/419 |
| 2006/0183505 A1 | 8/2006 | Willrich |
| 2006/0238497 A1 | 10/2006 | Velagapudi |
| 2007/0050129 A1 | 3/2007 | Salmre |
| 2007/0126698 A1 | 6/2007 | Iwamoto et al. |
| 2007/0156332 A1 | 7/2007 | Wailes et al. |
| 2007/0204014 A1 | 8/2007 | Greer et al. |
| 2007/0219708 A1 | 9/2007 | Brasche et al. |
| 2007/0282564 A1* | 12/2007 | Sprague et al. ............... 702/141 |
| 2008/0024500 A1 | 1/2008 | Bae |
| 2008/0026772 A1 | 1/2008 | Chang et al. |
| 2008/0036732 A1 | 2/2008 | Wilson et al. |
| 2008/0068376 A1 | 3/2008 | Anderson et al. |
| 2008/0090618 A1 | 4/2008 | Lim et al. |
| 2008/0165144 A1 | 7/2008 | Forstall et al. |
| 2008/0167080 A1 | 7/2008 | Su |
| 2008/0191864 A1 | 8/2008 | Wolfson |
| 2008/0231926 A1 | 9/2008 | Klug et al. |
| 2008/0266129 A1 | 10/2008 | Chiang |
| 2008/0280682 A1 | 11/2008 | Brunner et al. |
| 2008/0306685 A1 | 12/2008 | Bernardini et al. ............ 701/211 |
| 2009/0040289 A1 | 2/2009 | Hetherington et al. |
| 2009/0061960 A1 | 3/2009 | Chang et al. |
| 2009/0103780 A1 | 4/2009 | Nishihara et al. |
| 2009/0128516 A1 | 5/2009 | Rimon et al. |
| 2009/0137293 A1 | 5/2009 | Yoo et al. |
| 2009/0156264 A1 | 6/2009 | Cho et al. |
| 2009/0169060 A1 | 7/2009 | Faenger et al. |
| 2009/0228841 A1 | 9/2009 | Hildreth |
| 2009/0233627 A1 | 9/2009 | Chiu |
| 2009/0293012 A1 | 11/2009 | Alter et al. |
| 2009/0300554 A1 | 12/2009 | Kallinen |
| 2009/0310037 A1* | 12/2009 | Jung et al. ..................... 348/744 |
| 2010/0009696 A1 | 1/2010 | Fok et al. |
| 2010/0037184 A1 | 2/2010 | Sie |
| 2010/0050133 A1 | 2/2010 | Nishihara et al. |
| 2010/0066672 A1 | 3/2010 | Schoolcraft et al. |
| 2010/0066676 A1 | 3/2010 | Kramer et al. |
| 2010/0082983 A1 | 4/2010 | Shah et al. |
| 2010/0161658 A1 | 6/2010 | Hamynen et al. |
| 2010/0167711 A1 | 7/2010 | Alameh et al. |
| 2010/0210216 A1 | 8/2010 | Westlund |
| 2010/0240390 A1 | 9/2010 | Russ et al. |
| 2010/0241987 A1 | 9/2010 | Russ et al. |
| 2010/0241999 A1 | 9/2010 | Russ et al. |
| 2011/0022393 A1 | 1/2011 | Waller et al. |
| 2011/0103651 A1* | 5/2011 | Nowak et al. ................. 382/106 |
| 2012/0139939 A1 | 6/2012 | Russ et al. |

FOREIGN PATENT DOCUMENTS

| | | |
|---|---|---|
| JP | 2000-293120 | 10/2000 |
| JP | 2003-195843 | 7/2003 |
| JP | 2004-191642 | 7/2004 |
| JP | 2006-243200 | 9/2006 |
| JP | 2008-263622 | 10/2008 |
| WO | 2007-135776 A1 | 11/2007 |

OTHER PUBLICATIONS

"Signpost 2—Mobile AR Navigation System," Printed on Jan. 15, 2009, 13 pgs., http://studierstube.icg.tu-graz.ac.at/projects/mobile/SignPost2/.

Tetsuya Manabe et al., "On the M-CubITS Pedestrian Navigation System," Proceedings of the IEEE ITSC 2006, 2006 IEEE Intelligent Transportation Systems Conference, Toronto, Canada, Sep. 17-20, 2006, pp. 793-798, http://ieeexplore.iee.org/stamp/stamp.jsp?arnumber=01706840.

Allen Ka Lun Miu, "Design and Implementation of an Indoor Mobile Navigation System," Massachusetts Institute of Technology, Jan. 2002, pp. 1-60, http://nms.lcs.mit.edu/publications/cricketnav-thesis.pdf.

U.S. Office Action dated May 25, 2011 cited in U.S. Appl. No. 12/407,009.

Rich Gibson et al., "Google Maps Hacks," O'Reilly, pp. iii, 14, 19, 226, & 227, Jan. 2006.

Polle T. Zellweger et al., "City Lights: Contextual Views in Minimal Space," 2003 Conference on Human Factors in Computing Systems, pp. 838-839, Apr. 2003.

Sean Gustafson, "Visualizing Off-Screen Locations on Small Mobile Displays," Department of Computer Science, University of Manitoba, pp. i, 33-36, & 49, Dec. 2008.

U.S. Office Action dated Jun. 7, 2011 cited in U.S. Appl. No. 12/407,128.

International Search Report dated Oct. 20, 2010 cited in Application No. PCT/US2010/026717.

L. Chittaro, "Visualizing Information on Mobile Devices," Mar. 2006, 8 pgs., http://www.computer.org/portal/site/computer/menuitem.5d61c1d591162e4b0ef1bd108bcd45f3/index.jsp?&pName=computer_level1_article&TheCat=1005&path=computer/homepage/0306&file=cover.xml&xsl=article.xsl&;jsessionid=J6qNnKh50TfhhYWy8rTpByz4Ks0jKkHXvwpgTQJfKk3Tmj9wTp64!-1582182879.

Stefano Burigat et al., "Map, Diagram, and Web Page Navigation on Mobile Devices: the Effectiveness of Zoomable User Interfaces with Overviews," Sep. 2-5, 2008, 10 pgs., http://hcilab.uniud.it/publications/2008-09/ZoomableUserInterfaceswithOverviews_MOBHCI2008.pdf.

Yi Wang et al., "2D/3D Web Visualization on Mobile Devices," Printed on Jan. 23, 2009, 12 pgs., yi.wang.2005.googlepages.com/2D-3DWebVisualizationonMobileDevices.pdf.

Patrick Baudisch et al., "Halo: a Technique for Visualizing Off-Screen Locations," 8 pgs., CHI 2003, Apr. 5-10, 2003, Ft. Lauderdale, FL, http://www.darmstadt.gmd.de/~baudisch/Publications/2003-Baudisch-CHI03-Halo.pdf.

Sean Gustafson et al., "Wedge: Clutter-Free Visualization of Off-Screen Locations," pp. 1-10, CHI 2008, Apr. 5-10, 2008, Florence, Italy, http://www.patrickbaudisch.com/publications/2008-Gustafson-CHI08-WedgeClutterFreeVisualizationOfOffScreenLocations.pdf.

Stefano Burigat et al., "Visualizing Locations of Off-Screen Objects on Mobile Devices: A comparative Evaluation of Three Approaches," pp. 239-246, MobileHCI '06, Sep. 12-15, 2006, Helsinki, Finland, http://portal.acm.org/citation.cfm?id=1152266.

Mara Mihale, "NTT Docomo Separate Keitai Splits in Two," Oct. 3, 2008, 4 pgs., http://www.cameraphonesplaza.com/ntt-docomo-seperate-keitai-splits-in-two/.

(56) References Cited

OTHER PUBLICATIONS

Joshua Fruhlinger, "Dual-Display e-Book Concept Mimicks Reading, Makes Complete Sense," Jun. 26, 2008, 10 pgs., http://www.engadget.com/2008/06/26/dual-display-e-book-concept-mimicks-reading-makes-complete-sens/.

Gerrit Niezen et al., "Gesture Recognition as Ubiquitous Input for Mobile Phones," UbiComp '08 Workshop I1—Devices that Alter Perception (DAP 2008), Sep. 21, 2008, 5 pgs., http://www.k2.t.u-tokyo.ac.jp/perception/dap2008/papers/Niezen_dap2008.pdf.

Thomas Fuhrmann et al., "The BlueWand as Interface for Ubiquitous and Wearable Computing Environments," Printed on Jan. 21, 2009, 5 pgs., http://i30www.ira.uka.de/research/documents/p2p/2003/fuhrmann03bluewand-EPMCC.pdf.

Masaki Omata et al., "A Gesture-based Interface for Seamless Communication between Real and Virtual Worlds," $6^{th}$ ERCIM Workshop "User Interfaces for All", CNR-IROE, Florence, Italy, Oct. 25-26, 2000, 13 pgs., http://www.ui4all.gr/U14ALL-2000/files/Long_papers/Omata.pdf.

Jonathan Mooser et al., "Large Document, Small Screen: A Camera Driven Scroll and Zoom Control for Mobile Devices," CGIT Lab, University of Southern California, Feb. 15-17, 2008, pp. 27-34, http://graphics.usc.edu/~mooser/JM_I3D08.pdf.

Rajeev Sharma et al., "Speech/Gesture Interface to a Visual-Computing Environment," IEEE Computer Graphics and Applications, Mar./Apr. 2000, pp. 29-37, http://www.ks.uiuc.edu/Publications/Papers/PDF/SHAR2000/SHAR2000.pdf.

Marcio C. Cabral et al., "On the Usability of Gesture Interfaces in Virtual Reality Environments," Printed on Jan. 16, 2009, 9 pgs., http://www.lsi.usp.br/~mcabral/mcabralclihc2005.pdf.

Tovi Grossman et al., "Multi-Finger Gestural Interaction with 3D Volumetric Displays," UIST, Oct. 24-27, 2004, Santa Fe, New Mexico, 10 pgs., http://www.dgp.toronto.edu/papers/tgrossman_UIST2004.pdf.

U.S. Ex Parte Quayle Action dated Jul. 19, 2011 cited in U.S. Appl. No. 12/407,089.

U.S. Final Office Action dated Oct. 26, 2011 cited in U.S. Appl. No. 12/407,009, 15 pgs.

U.S. Final Office Action dated Oct. 26, 2011 cited in U.S. Appl. No. 12/407,128, 16 pgs.

Copending U.S. Appl. No. 13/396,955 entitled "Dual Module Portable Devices" filed Feb. 15, 2012.

European Communication Extended Search Report dated Feb. 21, 2014 cited in Application No. 10 75 3890.2, 7 pgs.

U.S. Final Office Action dated Mar. 27, 2013 cited in U.S. Appl. No. 12/407,128, 32 pgs.

U.S. Office Action dated Oct. 3, 2013 cited in U.S. Appl. No. 12/407,128, 40 pgs.

U.S. Office Action dated Sep. 12, 2012 cited in U.S. Appl. No. 12/407,009, 30 pgs.

Gibson et al., "Google Maps Hacks," O'Reilly Media, Jan. 2006, pp. iii, 14, 15, 19, 117-121, 226, & 227.

U.S. Office Action dated Sep. 12, 2012 cited in U.S. Appl. No. 12/407,128, 34 pgs.

Japanese Final Decision of Rejection dated Aug. 12, 2013 cited in Application No. 2012-500832, 5 pgs.

Japanese Notice of Rejection dated Apr. 9, 2013 cited in Application No. 2012-500832, 12 pgs.

Chinese Second Office Action dated Apr. 16, 2014 cited in Application No. 201080012903.1, 12 pgs.

U.S. Final Office Action dated May 21, 2014 cited in U.S. Appl. No. 12/407,128, 20 pgs.

Copending U.S. Appl. No. 14/451,460 entitled "Dual Module Portable Devices" filed Aug. 5, 2014.

\* cited by examiner

PROJECTED WAY-FINDING

RELATED APPLICATIONS

Related U.S. application Ser. No. 12/407,009, entitled "Tear-Drop Object Indication" (14917.1222US01), related U.S. application Ser. No. 12/407,089, entitled "Dual Module Portable Device" (14917.1224US01), and U.S. application Ser. No. 12/407,128, entitled "Gesture User Interface Manipulation" (14917.1226US01), filed on even date herewith, assigned to the assignee of the present application, are hereby incorporated by reference.

BACKGROUND

The Global Positioning System (GPS) is a global navigation satellite system (GNSS) developed by the United States Department of Defense and managed by the United States Air Force. It is the only fully functional GNSS in the world, can be used freely, and is often used by civilians for navigation purposes. A GPS navigation device is any device that receives GPS signals for determining a present position. The GPS navigation device calculates its position by precisely timing the signals sent by the GPS satellites high above the Earth. Each satellite continually transmits messages containing the time the message was sent, precise orbital information, and the general system health and rough orbits of all GPS satellites. The GPS navigation device measures the transit time of each message and computes the distance to each satellite. Geometric trilateration is used to combine these distances with the location of the satellites to determine the device's location.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Navigation information may be provided. First, a destination location may be received at a portable device. Next, a current location of the portable device maybe detected. Then, at least one way-point may be calculated based on the current location and the destination location. An orientation and a level of the portable device may be determined and the at least one way-point may then be projected from the portable device.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
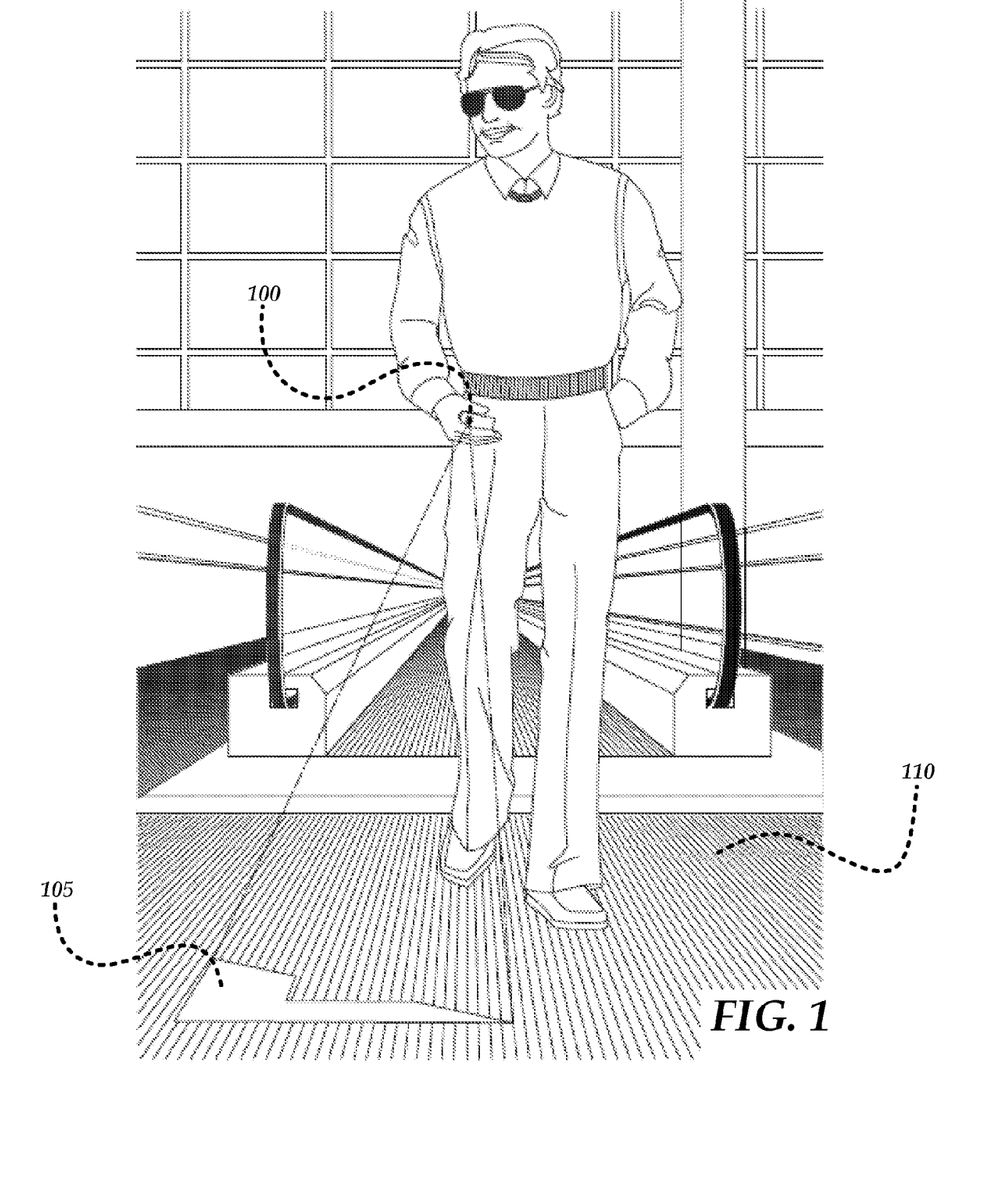
FIG. 1 is a diagram of an operating environment.

FIG. 1 is a diagram of an operating environment. As shown in FIG. 1, a user may use a portable device 100 to project way-point information. The way-point information may, for example, be projected from portable device 100 as an arrow 105 projected onto a surface 110. Portable device 100 may project way-point information in any manner and is not limited to projecting an arrow. In order to project way-point information, portable device 100 may include a projector, such as a micro-projector. Portable device 100 may comprise, but not limited to, a communications device, a mobile communications device, a mobile device, a personal digital assistant, a telephone, a cellular telephone, a smart phone, a computer, or a handheld computer. In addition, portable device 100 may comprise any device capable of providing voice and data services. Moreover, portable device 100 may comprise, include, or otherwise utilize computing device 300 as described in more detail below with respect to FIG. 3.

Embodiments of the invention may provide a process for projecting navigation information from portable device 100. In this way, for example, a user of a portable device may not need to refer to a screen of the portable device for the navigation information. Rather, a way-point associated with the navigation information may be projected from portable device 100 to a surface 110 in proximity to device 100. The navigation information may be projected in the form of an arrow 105. Arrow 105 may indicate turn-by-turn information for reaching a desired destination. As will be described in greater detail below, the projection of arrow 105 may be varied to account for an orientation of portable device 100, as well as its level. In this way, arrow 105 may properly direct a user towards the destination while accounting for a current direction the user is facing, as well as a surface 110 reflecting the projection.

Figure 2:
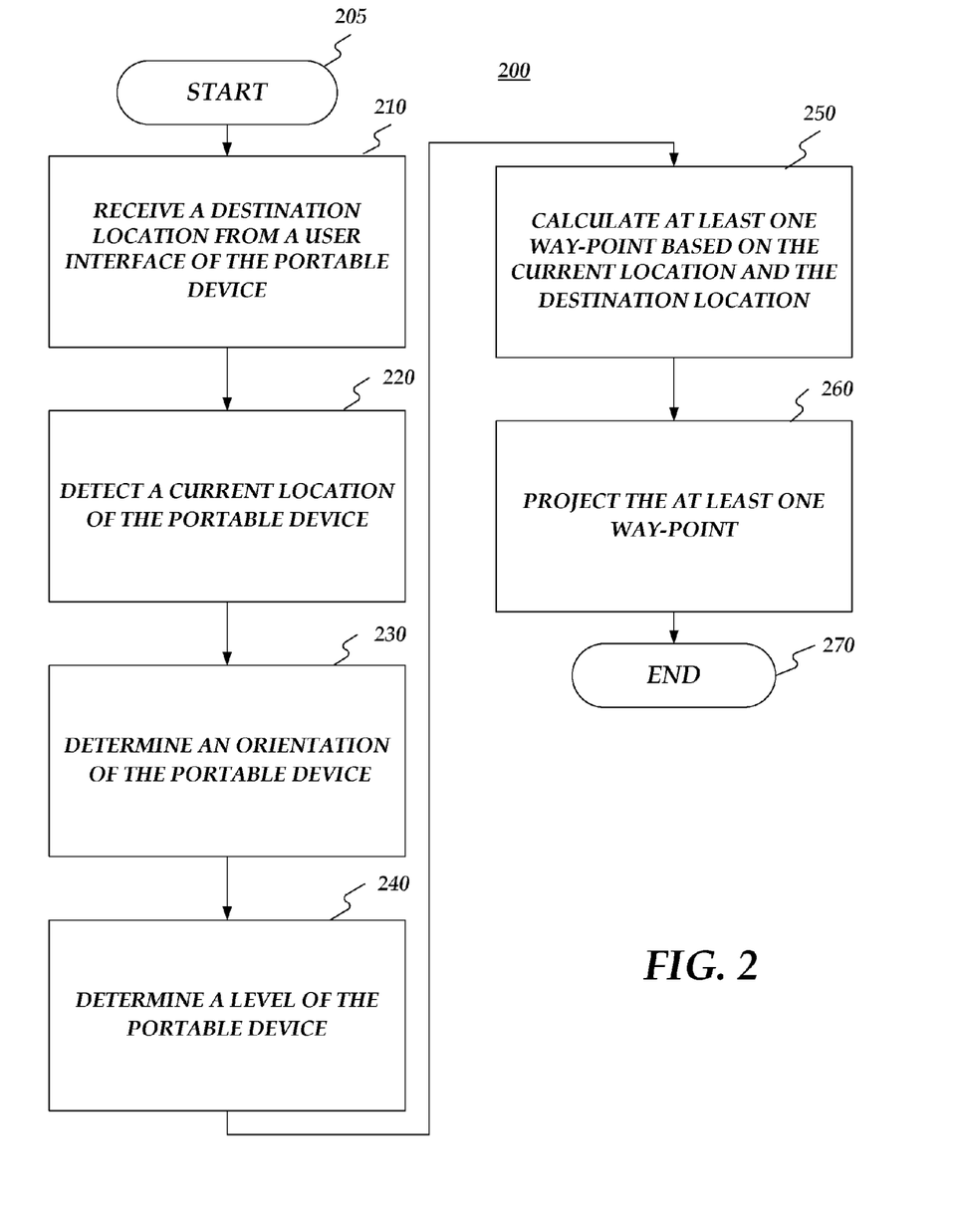
FIG. 2 is a flow chart of a method for providing way-finding.

FIG. 2 is a flow chart setting forth the general stages involved in a method 200 consistent with an embodiment of the invention for providing way-finding. Method 200 may be implemented using a computing device 300 as described in more detail below with respect to FIG. 3. Ways to implement the stages of method 200 will be described in greater detail below.

Method 200 may begin at starting block 205 and proceed to stage 210 where portable device 100 may receive a destination location from a user interface of portable device 100. For example, a map may be displayed on portable device 100 and a user may select an object or location on the map as the desired destination location. In other embodiments of the invention, the destination location may be communicated to portable device 100. In this way, when the user may not have sufficient information to provide the destination location, such as, for example, a location of a friend, a restroom or a seat in a stadium, an airport terminal, or any other point of interest, the destination location may be communicated to portable device 100.

From stage 210, where portable device 100 receives the destination location, method 200 may advance to stage 220 where portable device 100 may detect a current location of portable device 100. The current location of portable device 100 may be received, for example, from a position detection device integrated into portable device 100. The integrated position detection device may be operative to communicate with a Global Positioning System (GPS) or a localized positioning system to track the current location of portable device 100. In various other embodiments of the invention, portable device 100 may be configured to determine its approximate location by device triangulation.

Once portable device 100 detects the current location in stage 220, method 200 may continue to stage 230 where portable device 100 may determine an orientation of portable device 100. For example, portable device 100 may comprise an integrated direction detection device, such as a compass, for determining an orientation of portable device 100. With the orientation of portable device 100, way-point projection may properly account for a direction in which portable device 100 is oriented.

After portable device 100 determines the orientation in stage 230, method 200 may proceed to stage 240 where portable device 100 may determine a level of portable device 100. For example, accelerometer readings from at least one accelerometer located on portable device 100 may indicate an inclination, or level, of portable device 100. The way-point projection may take into account these accelerometer readings in order to determine whether the way-point information will be reflected on a surface below, across, or above portable device 100, for example. In this way, portable device 100 may not only utilize the position detection device to determine a position corresponding to the way-point information, but also incorporate the orientation and level readings to accurately project the way-point information.

From stage 240, where portable device 100 determines the level, method 200 may advance to stage 250 where portable device 100 may calculate at least one way-point based on the current location and the destination location. For example, route calculation may be performed by a way-finding application 320 as described in more detail below with respect to FIG. 3. Way-finding application 320 may not be integrated into portable device 100, but may reside remotely to and communicate wirelessly with portable device 100. In this way, portable device 100 may communicate the current location and the destination to way-finding application 320 and way-finding application 320 may return a calculated route. In other embodiments of the invention, the desired destination may not be provided directly from portable device 100 when way-finding application 320 is not internal to portable device 100. Rather, whereas a user may not be able to provide the destination location to portable device 100, the destination location may be directly provided to way-finding application 320 by any computing device in communication with way-finding application 320.

Once way-finding application 320 receives the current location and the desired location, way-finding application 320 may then calculate a route from the current location to the destination location. For example, the calculated route may comprise various turn-by-turn directions and multiple paths to the destination. Portable device 100 may be configured to automatically select a path or the user may manually choose which path to take. Once the path has been determined, portable device 100 may isolate a first way-point of the route for projection. The first way-point of the route may comprise turning information, a distance to a next turn, or a distance to the destination. Furthermore, portable device 100 may also isolate a second way-point of for simultaneous projection with the first way-point. In this way, two way-points of the route may be simultaneously projected from portable device 100. In various embodiments of the invention, isolated way-points may be directly provided to portable device 100 from way-finding application 320.

Once portable device 100 calculates the at least one way-point in stage 250, method 200 may continue to stage 260 where portable device 100 may project the at least one way-point. Projection may be performed by, for example, a micro-projector integrated into portable device 100. The way-point information may be projected according to the orientation and the level of portable device 100. As motioned above, the way-point information may comprise first turn information and next turn information, as well as a distance to an upcoming turn or the destination. This first turn and next turn information may be projected, for example, as an arrow or any other direction indicator. Once portable device 100 projects the at least one way-point in stage 260, method 200 may then end at stage 270.

An embodiment consistent with the invention may comprise a system for providing a portable device having navigation capability. The system may comprise a memory storage and a processing unit coupled to the memory storage. The processing unit may be operative to receive a destination location and a current location of the portable device; determine an orientation and a level of the portable device; determine at least one way-point to the destination location based at least in part on the current location and the destination location; provide instructions for projecting turn information corresponding the at least one way-point based at least in part on the orientation and the level; and cause a projection of the turn information in accordance with the instructions.

Another embodiment consistent with the invention may comprise a system for providing navigation information to a portable device. The system may comprise a memory storage and a processing unit coupled to the memory storage. The processing unit may be operative to receive a destination location for the portable device; detect a current location of the portable device; determining an orientation and level of the portable device; retrieve at least one way-point based at least in part on the current location and the destination location; and project the at least one way-point based at least in part on the device orientation and the device level.

Yet another embodiment consistent with the invention may comprise a system for providing a mobile communications device having navigation capability. The system may comprise a memory storage and a processing unit coupled to the memory storage. The processing unit may be operative to receive a destination location for the mobile communications device from at least one of the following: a user interface of the mobile communications device and a remote computing device; determine a current location of the mobile communications device; calculate a route from the current location to the destination location; determine at least one way-point of the route based at least in part on: the current location, the route, and the destination location; receive readings from a direction detection device operatively associated with the mobile communications device and at least one accelerometer; determine an orientation and a level of the mobile communications device based on the readings; and cause a projection of the at least one way-point based at least in part on: the orientation and the level of the mobile communications device.

Figure 3:
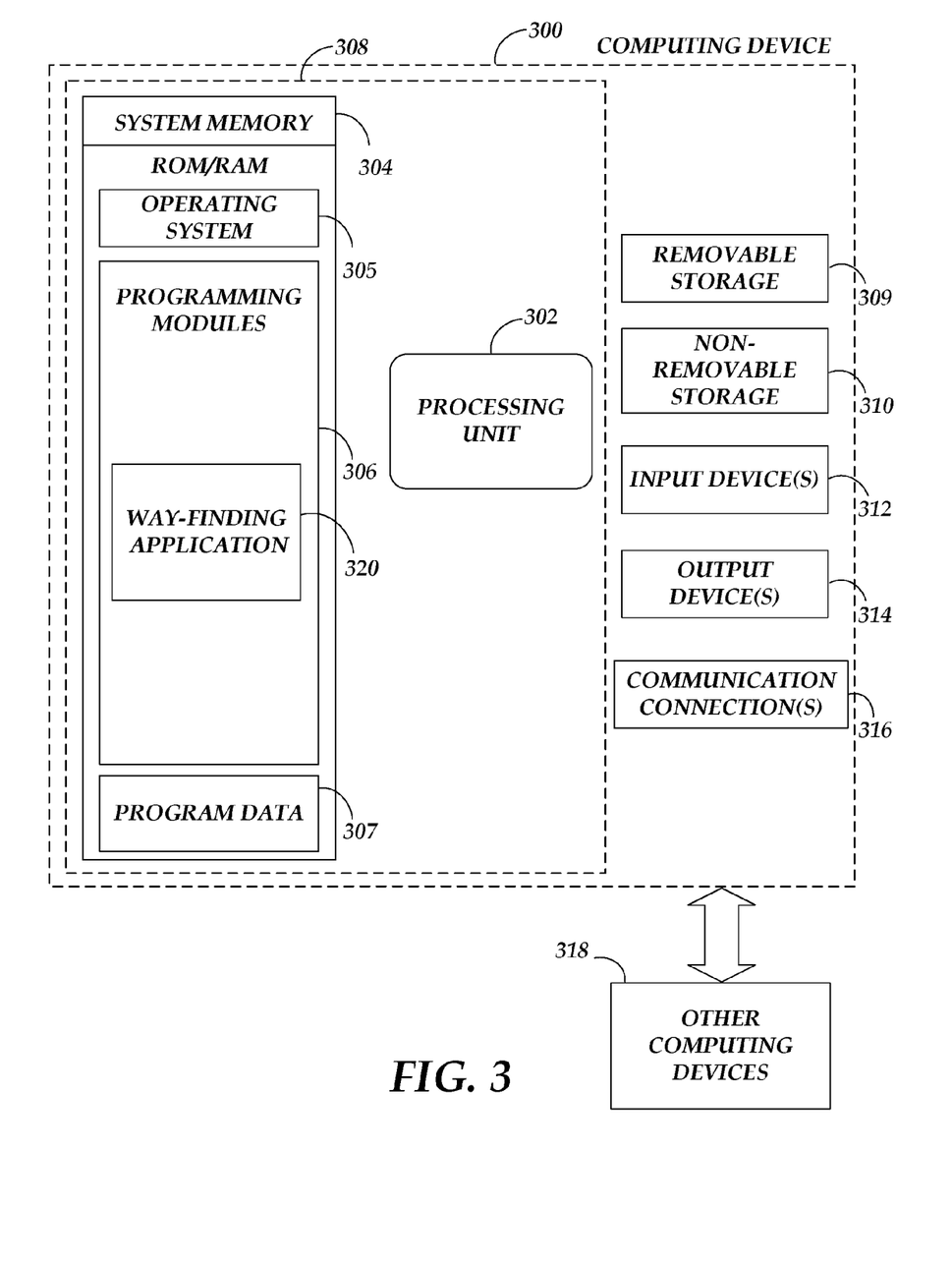
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for portable device 100 as described above. Portable device 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a program data 307. Operating system 305, for example, may be suitable for controlling computing device 300's operation. With embodiments of the invention, programming modules 306 may include way-finding application 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 305. While executing on processing unit 302, programming modules 306 (e.g. way-finding application 320) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A portable device having navigation capability, the portable device comprising:
    a memory storage; and
    a processing unit coupled to the memory storage, wherein the processing unit is operative to:
        receive a destination location;
        receive a current location of the portable device;
        determine an orientation of the portable device;
        determine a level of the portable device;
        determine at least one way-point to the destination location based at least in part on the current location and the destination location;
        provide instructions for projecting turn information corresponding to the at least one way-point based at least in part on the orientation and the level; and
        cause a projection of the turn information in accordance with the instructions on a proximal surface being navigated, the projected turn information comprising a projection of:
            current direction information, and
            next-turn information corresponding to a next-turn for the at least one way-point.

2. The portable device of claim 1, wherein the processing unit is further operative to receive the destination location from at least one of: a user interface of the portable device and a remote computing device.

3. The portable device of claim 1, wherein the processing unit is further operative to:
    determine a distance from the current location to the destination location; and
    cause a projection of the distance.

4. The portable device of claim 1, wherein the at least one-way point comprises at least one of the following: the next-turn information and a distance to a next-turn.

5. The portable device of claim 1, wherein the processing unit is further operative to determine the orientation of the portable device by reading data from an orientation detecting device integrated into the portable device.

6. The portable device of claim 1, wherein the processing unit is further operative to determine the level of the portable device by reading data from at least one accelerometer integrated into the portable device.

7. The portable device of claim 1, wherein the processing unit is further operative to determine the current location of the portable device by reading data from a position detection device.

8. The portable device of claim 1, wherein the processing unit being operative to cause the projection of the turn information comprises the processing unit being operative to cause the projection of the turn information at an integrated projection device.

9. A method for providing navigation information to a portable device, the method comprising;
    receiving a destination location for the portable device;
    detecting a current location of the portable device;
    determining an orientation of the portable device;
    determining a level of the portable device;
    retrieving by a computing device, at least one way-point based at least in part on the current location and the destination location; and
    projecting, on a proximal surface being navigated, the at least one way-point based at least in part on the device orientation and the device level, wherein projecting the at least one way-point comprises a projection of current direction information, and next-turn information.

10. The method of claim 9, further comprising:
determining a distance from the current location to the destination location; and
projecting the distance in proximity to the projected at least one way-point.

11. The method of claim 9, wherein retrieving the at least one way-point based at least in part on the current location and the destination location comprises calculating the next-turn information.

12. The method of claim 9, wherein receiving the destination location for the portable device comprises receiving the destination location for the portable device from at least one of the following: an external computing device, a user interface of the portable device, and another portable device.

13. The method of claim 9, wherein determining the orientation of the portable device comprises determining the orientation of the portable device by reading an integrated direction detection device of the portable device, and wherein determining the level of the portable device comprises determining the level of the portable device by reading at least one integrated accelerometer of the portable device.

14. The method of claim 9, wherein retrieving the at least one way-point based at least in part on the current location and the destination location comprises retrieving the at least one way-point from a remotely operated way-finding application, the way-finding application being operative to: receive the destination location and the current location and determine a route from the current location to the destination location.

15. A mobile communications device having navigation capability, the portable device comprising:
a memory storage; and
a processing unit coupled to the memory storage, wherein the processing unit is operative to:
receive a destination location for the mobile communications device from at least one of the following: a user interface of the mobile communications device and a remote computing device;
determine a current location of the mobile communications device;
calculate a route from the current location to the destination location;
determine at least one way-point of the route based at least in part on: the current location, the route, and the destination location;
receive a first reading from a direction detection device operatively associated with the mobile communications device;
determine an orientation of the mobile communications device based on the first reading;
receive a second reading from at least one accelerometer operatively associated with the mobile communications device;
determine a level of the mobile communications device based on the second reading; and
cause, on a proximal surface being navigated, a projection of the at least one way-point based at least in part on: the orientation of the mobile communications device and the level of the mobile communications device, the projection comprising a projection of:
a first turn information in a first portion of the projection, and
a next-turn information in a second portion of the projection.

16. The mobile communications device of claim 15, wherein the projection simultaneously provides the first turn information and the next-turn information and a distance to a next-turn corresponding to the next-turn information.

17. The mobile communications device of claim 15, wherein the processing unit is further operative to:
calculate a distance from the current location to the destination location, and
cause a projection of the distance along with the at least one way-point.

18. The mobile communications device of claim 15, wherein processing unit is further operative to receive the current location of the mobile communications device from an integrated position detection device operative to perform at least one of the following: communicate with a positioning system and determine the current location by device triangulation.

19. The mobile device of claim 15, wherein the mobile communications device is operative to provide voice and data services.

20. The mobile device of claim 15, wherein the processing unit being operative to cause the projection of the at least one way-point comprises the processing unit being operative to cause the projection of the at least one way-point at an integrated micro-projection device.

* * * * *